No. 746,896. PATENTED DEC. 15, 1903.
J. STOTT.
VALVE OR TAP.
APPLICATION FILED JUNE 19, 1903.
NO MODEL. 4 SHEETS—SHEET 1.

Witnesses: Inventor
James Stott
By
James L. Norris.
Atty.

No. 746,896. PATENTED DEC. 15, 1903.
J. STOTT.
VALVE OR TAP.
APPLICATION FILED JUNE 19, 1903.
NO MODEL. 4 SHEETS—SHEET 2.

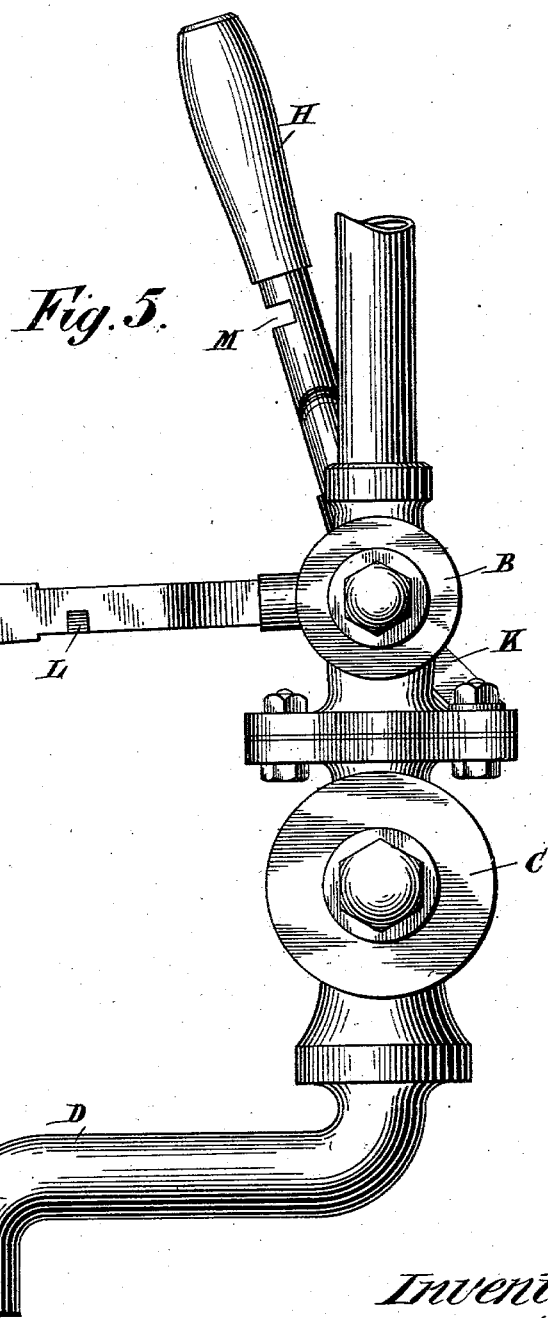

No. 746,896. PATENTED DEC. 15, 1903.
J. STOTT.
VALVE OR TAP.
APPLICATION FILED JUNE 19, 1903.
NO MODEL. 4 SHEETS—SHEET 4.
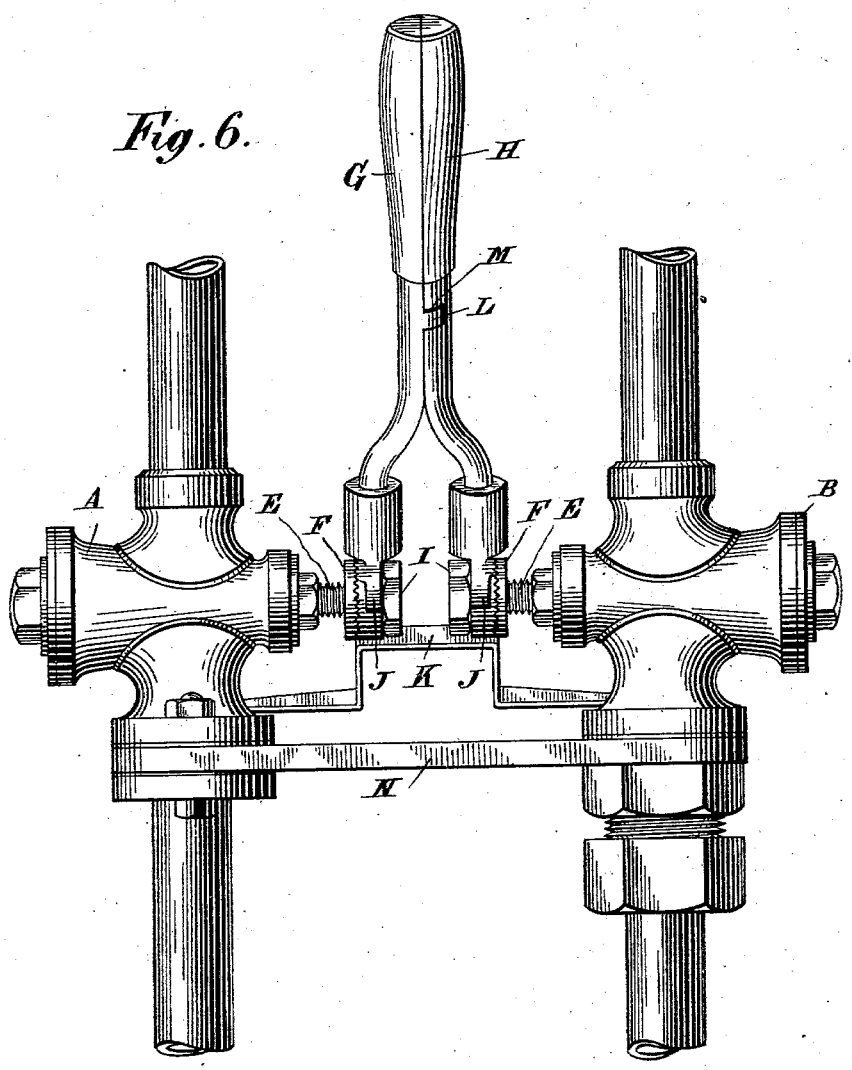

No. 746,896. Patented December 15, 1903.

UNITED STATES PATENT OFFICE.

JAMES STOTT, OF LONDON, ENGLAND.

VALVE OR TAP.

SPECIFICATION forming part of Letters Patent No. 746,896, dated December 15, 1903.

Application filed June 19, 1903. Serial No. 162,246. (No model.)

*To all whom it may concern:*

Be it known that I, JAMES STOTT, a subject of the King of Great Britain, residing at 158 Queen Victoria street, London, England, have invented certain new and useful Improvements in Valves or Taps, of which the following is a specification.

The object of this invention is to construct the operating appliances of valves or taps used for baths, geysers, and other apparatus in such a manner that the cold-water supply must be opened before the supply of steam, boiling water, or gas, and the steam, boiling water, or gas supply must be turned off before the water-supply, thus preventing all danger of persons being scalded in baths or the geyser being burned by not turning on the water-supply. Further, the appliances are adjustable that the temperature of the water supplying, say, a bath may be determined, this being specially applicable where steam is employed to heat the incoming water; but such adjustment may also be applied where gas is employed to heat the water. Both valves may be operated separately after the water-valve has been turned on, so that the water-supply may be altered in temperature, if desired.

My invention will be clearly understood by the following description, aided by the accompanying drawings, in which—

Figure 1:
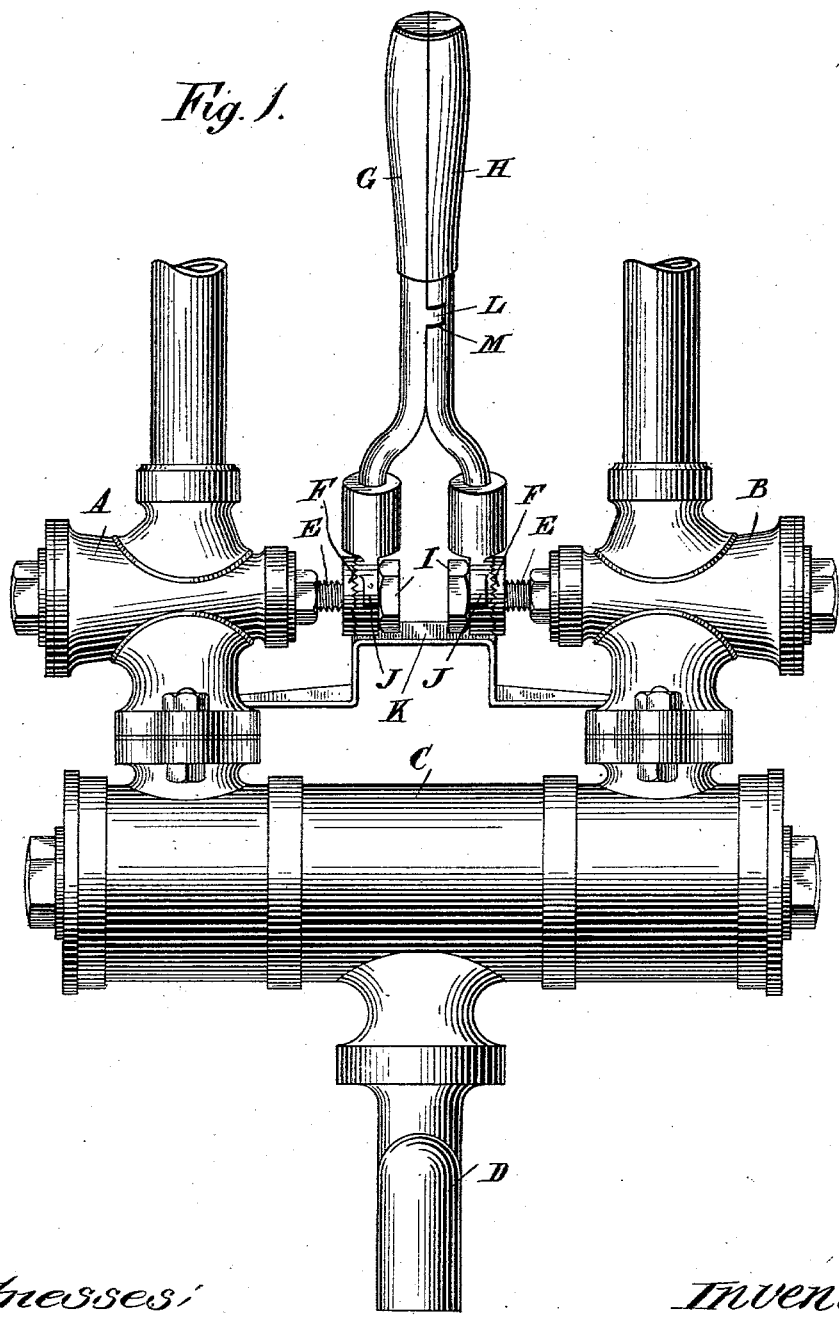
Figure 2:
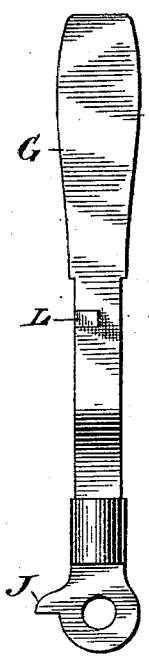
Figure 3:
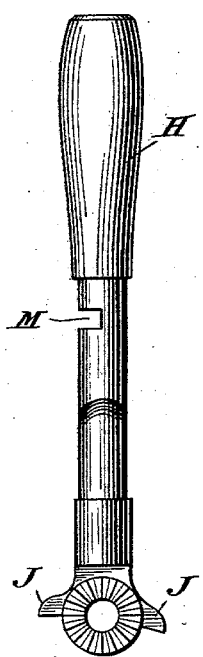
Figure 4:
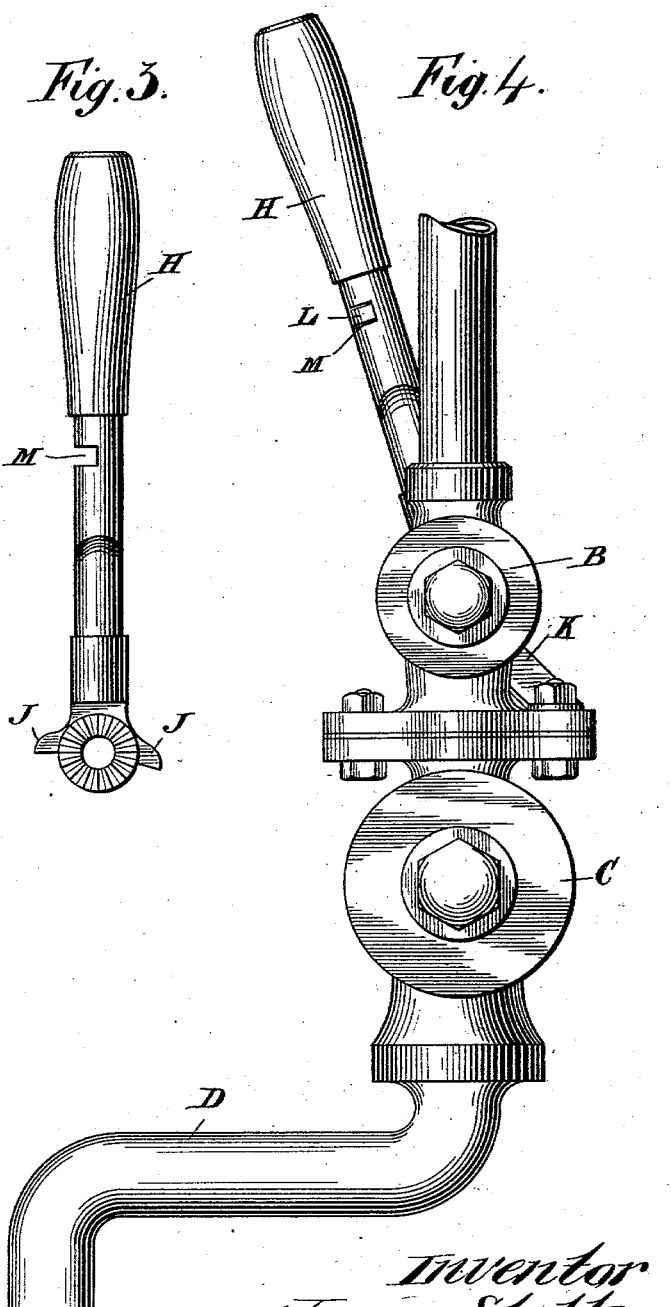

Figure 1 is a front elevation of my improved construction of tap or valve for cold and hot water or cold water and steam, the valves being closed. Figs. 2 and 3 are outside views of the two handles. Fig. 4 is a side view of Fig. 1. Fig. 5 is a side view with one handle open. Fig. 6 is a front view of the apparatus when constructed for gas and water.

For the purpose of my invention I will describe same when applied to taps wherein the water is heated by steam before passing to a bath.

I take two valves A B and place same end to end or side by side and connect them with a chamber C, forming the heating and mixing chamber, which chamber C is provided with the outlet D to the bath. One valve, A, is the water-valve, and the other, B, the steam-valve. On the stem E of each valve I fit a washer or ring F, having on one side or edge serrations or teeth, such washers or rings being fixed on the stems E or prevented revolving thereon. The operating-handle I form in halves G H, or, so to speak, two separate handles, and these I provide with serrations or teeth corresponding to the teeth or serrations on the rings or washers F, so that when the valves are adjusted as to their position in their casings each half-handle is placed in position upon the stems E. Their serrations or teeth engage the serrations or teeth on the rings F, and lock-nuts I on the stems E firmly fix the handles G H in position for actuation of the valves A B, the degree of opening of the valves A B being determined by the adjustment of the valves in their casings with regard to their handles, and such adjustment is made to suit the temperature of the water desired—that is to say, if a low temperature is desired the cold-water tap has the greatest lead, but if a high temperature is required the steam-tap has the greatest lead.

The half-handles G H are provided with lugs or stops J, which act against a bridge K or other appliance to limit the movement of the half-handles G H in closing and opening, and half-handle G, connecting the cold-water inlet, is also provided with a stop or projection L, which engages the other half-handle H, preferably in a slot M, so that when both valves A B are closed any actuation of the steam-valve B must carry the water-valve A with it to open the supply.

When the invention is applied to valves used for geysers and the like, the heating-chamber is dispensed with and the valves A B are connected to a plate N, as at Fig. 6, the water and gas supply being conducted to their respective positions; otherwise the construction and operation is the same.

What I claim, and desire to secure by Letters Patent, is—

1. In a combined apparatus of the class described, the combination of two alined valves, one for cold water and the other for steam, hot water, or gas, a split or two-part handle one part of which is fixed on the cold-water valve-stem, and the other part on the stem of the other valve, and a projection on the cold-water-valve handle arranged to abut the other handle when the two parts of the handle are brought together, whereby the cold-water-valve handle must be moved to open the cold-water valve before the steam, hot-water or gas valve can be opened, substantially as described.

2. In a combined apparatus of the class described, the combination of two valves the stems of which are in alinement and extend toward one another, one of said valves being for cold water and the other for steam, hot water or gas, collars on said stems provided with serrated faces, a split or two-part handle the two parts of which are provided with disks having serrated faces, said disks being mounted respectively on the valve-stems and the serrations of said disks engaging the serrations of said collars, and a projection on the cold-water-valve handle arranged to abut the other handle when the two handles are brought together, whereby the cold-water-valve handle must be moved to open the cold-water valve before the steam, hot-water or gas valve can be opened, substantially as described.

In testimony whereof I have hereunto set my hand in presence of two subscribing witnesses.

JAMES STOTT.

Witnesses:
ERNALD SIMPSON MOSELEY,
MALCOLM SMITHURST.